United States Patent
Schlegel

[15] 3,663,092
[45] May 16, 1972

[54] ELBOW MAGNIFYING LENS
[72] Inventor: Franz Schlegel, Munich, Germany
[73] Assignee: Optische Werke G. Rodenstock, Munich, Germany
[22] Filed: July 27, 1970
[21] Appl. No.: 58,632

[30] Foreign Application Priority Data
July 25, 1969 Germany .................. P 19 37 797.0

[52] U.S. Cl. ............................................ 350/176, 350/202
[51] Int. Cl. ................................. G02b 1/00, G02b 17/00
[58] Field of Search ............................... 350/176, 202

[56] References Cited
FOREIGN PATENTS OR APPLICATIONS
1,145,822  3/1963  Germany .................. 350/202
427,341  6/1967  Switzerland .............. 350/202
441,806  1/1968  Switzerland .............. 350/176

Primary Examiner—David Schonberg
Assistant Examiner—Paul A. Sacher
Attorney—Craig, Antonelli & Hill

[57] ABSTRACT

A four element magnifier with right angle prism which includes, in the direction from the eye to the object, a three-component lens with two cemented surfaces, two single collecting lens and a further two-component collecting lens with one cemented surface which is adjoined by a right angle prism.

5 Claims, 1 Drawing Figure

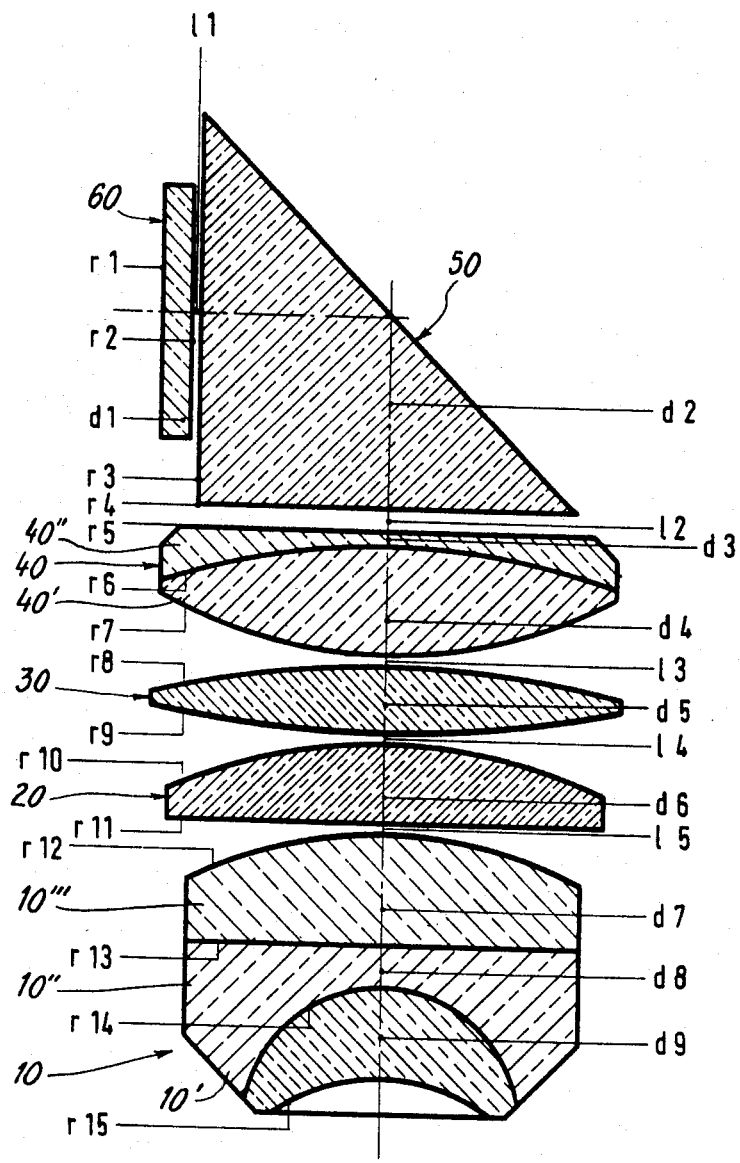

ELBOW MAGNIFYING LENS

The present invention relates to a magnifier for the observation of a plane or flat object surface, for example, of the luminescent screen or target of an image converter tube whereby the path of rays between this object surface and the lenses of the magnifier are bent at a right angle through a prism. Such types of magnifying lenses are to possess an enlargement or magnification factor of 10 to 15 times, i.e., have a focal distance between 16 and 25 mm, preferably a focal distance of about 20 mm, and a field angle of at least 50°. Since an eye more or less adapted to darkness has to obverve the screen or target with a large pupil through the magnifying lens, a high aperture ratio results, for which the magnifying lens has to be corrected for the customary image defects and abberations. The space between the object surface and magnifier, i.e., the distance between back lens and object, is filled with a very highly refractive glass in order to be able to accommodate in that case a right angle prism with shortest possible optical glass path.

Such a type of magnifier is already known as such in German Pat. No. 1,260,190.

However, it has been found that with the improvement of the luminescent screens or targets in image converter tubes, also the image power of the magnifier optics has to be increased; it is necessary for that purpose to distribute the refractive powers more uniformly over the individual image-forming elements of the angular magnifying lens which altogether includes four elements each with collective or condenser effect. Two inner single collective lenses are enclosed by cemented lens elements, of which the cemented lens element facing the prism or object surface includes a single cemented surface whereas the cemented lens element facing the eye includes two cemented surfaces. It is obvious that the tube wall of the image converter is included in the correction, and that, apart from this tube wall, glasses are utilized throughout whose refractive index lies only occasionally below the value of 1.7 while the refractive index for several lenses of the system amounts to about 1.8 and above.

Accordingly, it is an object of the present invention to provide a magnifier which avoids by simple means the aforementioned shortcomings and drawbacks encountered in the prior art.

Another object of the present invention resides in an improved elbow magnifier which permits the attainment of an increase in the optical power thereof.

A further object of the present invention resides in an improved angular magnifying lens which achieves the aforementioned aims and objects by simple means utilizing only four lens elements and a prism.

These and further objects, features and advantages of the present invention will become more obvious from the following description when taken in connection with the accompanying drawing which shows, for purposes of illustration only, one embodiment in accordance with the present invention, and wherein:

The single FIGURE is a somewhat schematic, axial longitudinal cross-sectional view through a magnifying lens in accordance with the present invention and illustrating the various optical elements thereof according to the Example II of the following Table 2.

Referring now to the single FIGURE of the drawing, the magnifying lens in accordance with the present invention includes four lens elements generally designated by reference numerals 10, 20, 30 and 40. The lens unit 10 which is located nearest the eye of the viewer, consists of three lens components 10', 10'' and 10''' joined along two cemented surfaces, of which the lens element 10' is a converging meniscus, the lens element 10'' a diverging meniscus or a plano-concave lens and the element 10''' a converging meniscus or a plano-convex lens. The two inner lenses 20 and 30 are single lenses and form a converging meniscus or plano-convex lens (lens 20) and a biconvex lens (lens 30). The lens unit 40 consists of two components 40' and 40'' with a single cemented surface therebetween, of which the lens 40' is a biconvex lens and the lens 40'' a plano-concave lens. Reference numeral 50 designates a right angle prism by means of which the light rays are deflected through 90°. Intermediate the object, formed, for example, by the target of an image converter tube, is a glass element generally designated by reference numeral 60 which is the anode disc. The space between anode disc and magnifier is filled with a very highly refractive glass in order to be able to utilize a right angle prism with an optical glass path that is as short as possible.

As to the rest, the task to achieve an increased image output, as compared to the aforementioned prior art, by a more uniform distribution of the powers of refraction, is assured by an optical system having the data and surface powers of refraction that lie within the ranges indicated in the following Table 1. This Table 1 is valid for about $f=1$.

In the following Table 2 are indicated two examples with a focal distance of about $f=19$ mm.

Analogous units are used in Tables 1 and 2 for the various parameters in which $s_1$ is the distance between the fluorescent coating and the tube wall, i.e., the fluorescent coating is directly applied to the tube wall, in which coating the picture to be observed is produced. $r$ with an appropriate suffix refers to the respective radius of curvature, $d$ with an appropriate suffix to the respective thickness of a given optical element along its axial dimension, $l$ with an appropriate suffix to the axial spacing between the surfaces of two adjacent optical elements and $\phi$ with an appropriate suffix to the power of refraction of a surface, thus $\phi=(n'-n):r$, where $n$ and $n'$ are the refraction coefficient in front of and behind the surface in question and $r$ is the radius of curvature of the surface.

TABLE 1

| | |
|---|---|
| $s_1=0$ | |
| $r_1=\infty$ | $0.25<d_1<0.28$ |
| $r_2=\infty$ | $0.02<l_1<0.06$ |
| $r_3=\infty$ | $1.7<d_2<1.8$ |
| $r_4=\infty$ | $0.05<l_2<0.15$ |
| $r_5=\infty$ | $0.05<d_3<0.08$ |
| $\varphi$ | $-0.03<\varphi_6<-0.09$ |
| | $0.5<d_4<0.6$ |
| $\varphi$ | $+0.3<\varphi_7<+0.4$ |
| | $0<l_3<0.02$ |
| $\varphi$ | $+0.14<\varphi_8<+0.18$ |
| | $0.3<d_5<0.4$ |
| $\varphi$ | $+0.1<\varphi_9<+0.18$ |
| $\varphi$ | $0<l_4<0.02$ |
| $\varphi$ | $+0.3<\varphi_{10}<+0.4$ |
| | $0.25<d_6<0.45$ |
| $\varphi$ | $-0.14<\varphi_{11}<+0.03$ |
| | $0<l_5<0.02$ |
| $\varphi$ | $+0.4<\varphi_{12}<+0.5$ |
| | $0.2<d_7<0.6$ |
| $\varphi$ | $-0.03<\varphi_{13}<+0.12$ |
| | $0.15<d_8<0.6$ |
| $\varphi$ | $-0.15<\varphi_{14}<-0.35$ |
| | $0.35<d_9<0.10$ |
| | $-0.8<\varphi_{15}<-1.1$ |

TABLE 2

| Example I, f=19.36 | | $n_e/\nu_e$ | Example II, f=19.15 | | $n_e/\nu_e$ |
|---|---|---|---|---|---|
| $s_1=0$ | | | | | |
| $r_1=\infty$ | $d_1=5.1$ | 1.510/61 | $r_1=\infty$ | $d_1=5.1$ | 1.510/61 |
| $r_2=\infty$ | $l_1=1.13$ | | $r_2=\infty$ | $l_1=0.5$ | |
| $r_3=\infty$ | $d_2=34$ | 1.789/43.6 | $r_3=\infty$ | $d_2=34$ | 1.789/43.6 |
| $r_4=\infty$ | $l_2=1$ | | $r_4=\infty$ | $l_2=1.7$ | |
| $r_5=\infty$ | $d_3=1.3$ | 1.840/42.0 | $r_5=\infty$ | $d_3=1.25$ | 1.928/21.3 |
| $r_6=+80.3$ | $d_4=10.5$ | 1.694/54.5 | $r_6=+58.7$ | $d_4=10.3$ | 1.694/54.5 |
| $r_7=-43.6$ | | | $r_7=-40.7$ | | |

TABLE 2 – Continued

| Example I, f=19.36 | | $n_e/\nu_e$ | Example II, f=19.15 | | $n_e/\nu_e$ |
|---|---|---|---|---|---|
| $r_8=+91.1$ | $l_3=0.1$ | | $r_8=+91.4$ | $l_3=0.1$ | |
| | $d_5=6.9$ | 1.721/47.7 | | $d_5=5.95$ | 1.721/47.7 |
| $r_9=-120.1$ | $l_4=0.1$ | | $r_9=-103.3$ | $l_4=0.1$ | |
| $r_{10}=+42.6$ | | | $r_{10}=+47.5$ | | |
| | $d_6=5.7$ | 1.721/47.7 | | $d_6=7.35$ | 1.755/34.7 |
| $r_{11}=+141.8$ | | | $r_{11}=\infty$ | | |
| | $l_5=0.1$ | | | $l_5=0.1$ | |
| $r_{12}=+31.06$ | | | $r_{12}=+39.24$ | | |
| | $d_7=4.8$ | 1.721/47.7 | | $d_7=10.0$ | 1.855/23.0 |
| $r_{13}=+52.9$ | | | $r_{13}=\infty$ | | |
| | $d_8=9.35$ | 1.973/19.96 | | $d_8=3.5$ | 1.963/20.0 |
| $r_{14}=+11.76$ | | | $r_{14}=+12.59$ | | |
| | $d_9=8.0$ | 1.792/25.9 | | $d_9=7.8$ | 1.855/23.0 |
| $r_{15}=+17.91$ | | | $r_{15}=+16.85$ | | |

While I have shown and described only one embodiment in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim:

1. A magnifying lens, with a field angle of at least about 50°, and with an object space substantially filled with a glass, essentially consisting of four collecting lenses, of which the two inner lenses represent single lenses and the two outer lenses cemented lenses, characterized by the following data;

| | | $n_e/\nu_e$ |
|---|---|---|
| $r_1=\infty$ | | |
| | $d_1=5.1$ | 1.510/61 |
| $r_2=\infty$ | | |
| | $l_1=0.5$ | |
| $r_3=\infty$ | | |
| | $d_2=34$ | 1.789/43.6 |
| $r_4=\infty$ | | |
| | $l_2=1.7$ | |
| $r_5=\infty$ | | |
| | $d_3=1.25$ | 1.928/21.3 |
| $r_6=+58.7$ | | |
| | $d_4=10.3$ | 1.694/54.5 |
| $r_7=-40.7$ | | |
| | $l_3=0.1$ | |
| $r_8=+91.4$ | | |
| | $d_5=5.95$ | 1.721/47.7 |
| $r_9=-103.3$ | | |
| | $l_4=0.1$ | |
| $r_{10}=+47.5$ | | |
| | $d_6=7.35$ | 1.755/34.7 |
| $r_{11}=\infty$ | | |
| | $l_5=0.1$ | |
| $r_{12}=+39.24$ | | |
| | $d_7=10.0$ | 1.855/23.6 |
| $r_{13}=\infty$ | | |
| | $d_8=3.5$ | 1.963/20.2 |
| $r_{14}=+12.59$ | | |
| | $d_9=7.8$ | 1.855/23.6 |
| $r_{15}=+16.85$ | | | wherein $r_n$ refers to the respective radius of curvature, $d_n$ refers to the respective thickness of a given optical element along its axial dimension, $l_n$ is the axial spacing between the surfaces of two adjacent optical elements, $n$ refers to the index of refraction, and $\gamma$ is the Abbe number.

2. A magnifier, with a field angle of at least about 50° and with an object space substantially filled with glass, that includes four collecting lens elements of which the two inner elements are single lenses and the two outer elements are cemented lenses, characterized by the following relation:

| | | $n_e/\nu_e$ |
|---|---|---|
| $s_1=0$ | | |
| $r_1=\infty$ | | |
| | $d_1=0.25-0.28$ | |
| $r_2=\infty$ | | |
| | $l_1=0.02-0.06$ | |
| $r_3=\infty$ | | |
| | $d_2=1.7-1.8$ | |
| $r_4=\infty$ | | |
| $r_5=\infty$ | | |
| $\varphi_6=-0.03--0.09$ | | $l_2=0.05-0.15$ |
| | | $d_3=0.05-0.08$ |
| $\varphi_7=+0.3-+0.4$ | | $d_4=0.5-0.6$ |
| $\varphi_8=+0.14-+0.18$ | | $l_3=0-0.02$ |
| $\varphi_9=+0.1-+0.18$ | | $d_5=0.3-0.4$ |
| $\varphi_{10}=+0.3-+0.4$ | | $l_4=0-0.02$ |
| $\varphi_{11}=-0.14-+0.03$ | | $d_6=0.25-0.45$ |
| $\varphi_{12}=+0.4-+0.5$ | | $l_5=0-0.02$ |
| $\varphi_{13}=-0.03-+0.12$ | | $d_7=0.2-0.6$ |
| $\varphi_{14}=-0.15--0.35$ | | $d_8=0.15-0.6$ |
| $\varphi_{15}=-0.8--1.1$ | | $d_9=0.35-0.50$ | wherein $r_n$ refers to the respective radius of curvature, $d_n$ refers to the respective thickness of a given optical element along its axial dimension, $l_n$ is the axial spacing between the surfaces of two adjacent optical elements $n$ refers to the index to the refraction, $\gamma$ is the Abbe number and $\phi=(n-n)/r$, the power of refraction of a surface.

3. A magnifier according to claim 2, characterized by the following data:

| | | $n_e/\nu_e$ |
|---|---|---|
| $r_1=\infty$ | | |
| | $d_1=5.1$ | 1.510/61 |
| $r_2=\infty$ | | |
| | $l_1=1.13$ | |
| $r_3=\infty$ | | |
| | $d_2=34$ | 1.789/43.6 |
| $r_4=\infty$ | | |
| | $l_2=1$ | |
| $r_5=\infty$ | | |
| | $d_3=1.3$ | 1.840/42.0 |
| $r_6=+80.3$ | | |
| | $d_4=10.5$ | 1.694/54.5 |
| $r_7=-43.6$ | | |
| | $l_3=0.1$ | |
| $r_8=+91.1$ | | |
| | $d_5=6.9$ | 1.721/47.7 |
| $r_9=-120.1$ | | |
| | $l_4=0.1$ | |
| $r_{10}=+42.6$ | | |
| | $d_6=5.7$ | 1.721/47.7 |
| $r_{11}=+141.8$ | | |
| | $l_5=0.1$ | |
| $r_{12}=+31.06$ | | |
| | $d_7=4.8$ | 1.721/47.7 |
| $r_{13}=+52.9$ | | |
| | $d_8=9.35$ | 1.973/19.96 |
| $r_{14}=+11.76$ | | |
| | $d_9=8.0$ | 1.792/25.9 |
| $r_{15}=+17.91$ | | | wherein $r_n$ refers to the respective radius of curvature, $d_n$ refers to the respective thickness of a given optical element along its axial dimension, $l_n$ is the axial spacing between the surfaces of two adjacent optical elements, $n$ refers to the index of refraction, and $\gamma$ is the Abbe number.

4. A magnifier according to claim 2, characterized by the following data:

| | | $n_e/\nu_e$ |
|---|---|---|
| $r_1=\infty$ | | |
| | $d_1=5.1$ | 1.510/61 |
| $r_2=\infty$ | | |
| | $l_1=0.5$ | |
| $r_3=\infty$ | | |
| | $d_2=34$ | 1.789/43.6 |
| $r_4=\infty$ | | |
| | $l_2=1.7$ | |
| $r_5=\infty$ | | |
| | $d_3=1.25$ | 1.928/21.3 |
| $r_6=+58.7$ | | |

|  |  | $n_e/\nu_e$ |
|---|---|---|
| $r_7 = -40.7$ | $d_4 = 10.3$ | 1.694/54.5 |
| $r_8 = +91.4$ | $l_3 = 0.1$ |  |
| $r_9 = -103.3$ | $d_5 = 5.95$ | 1.721/47.7 |
| $r_{10} = +47.5$ | $l_4 = 0.1$ |  |
| $r_{11} = \infty$ | $d_6 = 7.35$ | 1.755/34.7 |
| $r_{12} = +39.24$ | $l_5 = 0.1$ |  |
| $r_{13} = \infty$ | $d_7 = 10.$ | 1.855/23.6 |
| $r_{14} = +12.59$ | $d_8 = 3.5$ | 1.963/20.2 |
| $r_{15} = +16.85$ | $d_9 = 7.8$ | 1.855/23.6 | wherein $r_n$ refers to the respective radius of curvature, $d_n$ refers to the respective thickness of a given optical element along its axial dimension, $l_n$ is the axial spacing between the surfaces of two adjacent optical elements, $n$ refers to the index of refraction, and $\gamma$ is the Abbe number.

5. A magnifying lens with a field angle of at least about 50°, and with an object space substantially filled with a glass, essentially consisting of four collecting lenses, of which the two inner lenses represent single lenses and the two outer lenses cemented lenses, characterized by the following data;

|  |  | $n_e/\nu_e$ |
|---|---|---|
| $r_1 = \infty$ | $d_1 = 5.1$ | 1.510/61 |
| $r_2 = \infty$ | $l_1 = 1.13$ |  |
| $r_3 = \infty$ | $d_2 = 34$ | 1.789/43.6 |
| $r_4 = \infty$ | $l_2 = 1$ |  |
| $r_5 = \infty$ | $d_3 = 1.3$ | 1.840/42.0 |
| $r_6 = +80.3$ | $d_4 = 10.5$ | 1.694/54.5 |
| $r_7 = -43.6$ | $l_3 = 0.1$ |  |
| $r_8 = +91.1$ | $d_5 = 6.9$ | 1.721/47.7 |
| $r_9 = -120.1$ | $l_4 = 0.1$ |  |
| $r_{10} = +42.6$ | $d_6 = 5.7$ | 1.721/47.7 |
| $r_{11} = +141.8$ | $l_5 = 0.1$ |  |
| $r_{12} = +31.06$ | $d_7 = 4.8$ | 1.721/47.7 |
| $r_{13} = +52.9$ | $d_8 = 9.35$ | 1.973/19.96 |
| $r_{14} = +11.76$ | $d_9 = 8.0$ | 1.792/25.9 |
| $r_{15} = +17.91$ |  |  | wherein $r_n$ refers to the respective radius of curvature, $d_n$ refers to the respective thickness of a given optical element along its axial dimension, $l_n$ is the axial spacing between the surfaces of two adjacent optical elements, $n$ refers to the index of refraction, and $\gamma$ is the Abbe number.

* * * * *